Figure 1:
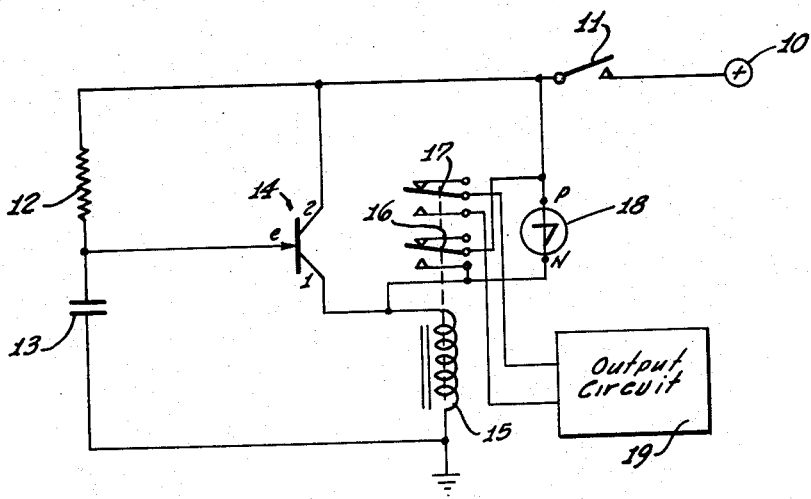

Dec. 10, 1963         H. T. WINCHEL         3,114,083

TIMING CIRCUIT

Filed Nov. 24, 1959

INVENTOR:
Henry T. Winchel

By Smyth & Roston
Attorneys.

3,114,083
TIMING CIRCUIT
Henry T. Winchel, Culver City, Calif., assignor to Consolidated Electronics Industries Corp., New York, N.Y., a corporation of Delaware
Filed Nov. 24, 1959, Ser. No. 855,230
7 Claims. (Cl. 317—148.5)

This invention relates to timing circuitry and, more particularly, to electronic circuitry for indicating with precision a particular period of time. The invention is especially concerned with electronic circuitry for indicating a particular period during which voltage is applied from a source.

In many applications, it is desirable or even necessary to measure a period of time with a considerable degree of precision. For example, it may be desired in an industrial process to introduce precise amounts of a number of different materials to a mixing chamber so that a product with optimum properties is obtained. In order to provide the proper amount of each material in the mixture, it may be necessary to precisely control the duration during which each material is introduced to the mixture. In these applications, highly sensitive relays are often utilized to provide an electrical indication of the termination of the timing period. For timing accuracy, sensitive, low voltage relays have heretofore been required.

In a specific illustrative embodiment of this invention, a timing circuit is provided including means providing for an accurate timing period in a wide range of relay parameters. The relay may have a relatively high impedance winding, but the accuracy provided by the timing circuit corresponds to the accuracy achieved heretofore utilizing highly sensitive relays. The timing period is not dependent upon the characteristics of the relay within a wide range.

The relay winding is serially connected with transistor means which is controlled by a capacitive circuit arrangement. The transistor means becomes conductive a predetermined interval after a source of potential is coupled across the capacitive circuit arrangement. The transistor means is coupled to a two condition device as well as to the relay winding. When the transistor means becomes conductive, a surge of current is provided through the relay winding which develops a control electromotive force. The developed electromotive force across the relay winding operates the two-condition device to provide a low impedance operating path for the relay winding. The relay accordingly operates and provides an indication of the termination of the timing interval.

Further features of this invention relate to the provision of means for automatically restoring the two-condition device to its original condiiton when the relay operates. The relay remains locked operated. Due to the fact that the relay winding is not energized from the capacitive arrangement, the capacitor included therein may be relatively small.

Figure 2:
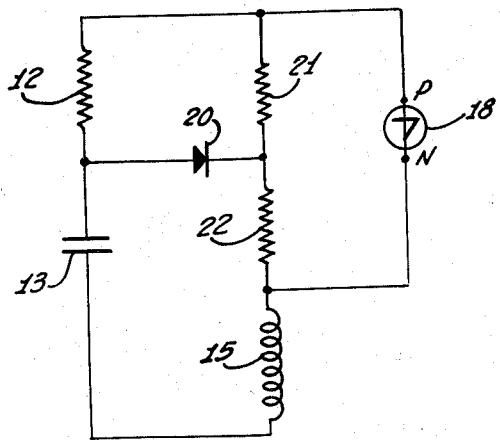

Further advantages and features of this invention will become apparent upon consideration of the following description when read in conjunction with the drawing wherein:

FIGURE 1 is a circuit diagram of one embodiment of the timing circuit of this invention; and FIGURE 2 is a schematic diagram of the timing circuit of this invention on an equivalent electrical circuit basis.

In FIGURE 1, a source 10 is adapted to provide a suitable direct voltage such as approximately 20 volts. The source 10, which may be a battery or any other suitable means for providing a direct voltage, has its positive terminal connected to the stationary contact of a single pole switch 11. The negative terminal, not shown, of the source 10 may be grounded. When the movable arm of the switch 11 is operated to complete a connection from the source 10, the source 10 initiates the timing interval of the electronic timing circuit depicted in FIGURE 1.

The movable arm of the switch 11 is connected to a resistor 12 which may have a suitable value such as 1 megohm. The resistor 12 is part of a capacitive arrangement which also includes a capacitor 13 having a suitable value such as 30 microfarads. The resistor 12 is serially connected with the capacitor 13 between the movable arm of the switch 11 and a ground connection. The potential across the capacitor 13 increases at an exponential rate determined by the values of the resistor 12 and the capacitor 13. A semi-conductor 14 designated as a uni-junction transistor is connected between the movable arm of the switch 11 and the junction of the resistor 12 and the capacitor 13. A uni-junction transistor is a three-terminal transistor of the type manufactured by the General Electric Company designated by the numbers 2N489 through 2N494, inclusive, depending upon the characteristic desired for the uni-junction transistor.

The three terminals of the uni-junction transistor 14 are designated respectively as the emitter $e$, base 1 and base 2. The emitter $e$ of the uni-junction transistor 14 is connected to the common terminal of the resistor 12 and the capacitor 13. The base 2 of the uni-junction transistor 14 is connected to the movable arm of the switch 11, and the base 1 of the uni-junction transistor 14 is connected to the winding of a relay 15. One terminal of the winding 15 is connected to the base 1 and its other terminal is connected to the common ground connection. The relay 15 may be a conventional type relay having a direct current impedance of 300 ohms and a 26 volt operating level.

When the movable arm of the switch 11 engages the stationary contact, current flows through a circuit including the voltage source 10, the movable arm of the switch 11, the resistor 12 and the capacitor 13. The capacitor 13 changes at a rate dependent upon the potential of the source 10 and upon the values of the resistor 12 and the capacitor 13. With the resistor 12 having a resistance of 1 megohm and the capacitor 13 having a capacitance of 30 microfarads, the timing constant of the arrangement is 30 seconds. The capacitor 13 is actually relatively small and the resistor 12 is relatively large to provide for the 30 second timing interval. The capacitor 13 may be small because, as is hereinafter described, it is not utilized as a source of current for energizing the winding of the relay 15.

The uni-junction transistor 14 is non-conductive during the period of time in which the capacitor 13 is being charged. During this time, the impedance between the emitter $e$ and the base 1 of the uni-junction transistor 14 is quite high such as in the order of several million ohms. The impedance between the base 2 and the base 1 of the transistor 14 is also somewhat high such as in the order of 10 kilohms. The impedance between the emitter $e$ and the base 1 of the transistor 14 and between the base 1 and the base 2 of the transistor 14 are respectively illustrated schematically at 21 and 22 in FIGURE 2 which is an equivalent circuit of a portion of the timing circuit depicted in FIGURE 1.

When the capacitor 13 becomes charged to a particular value, the potential at the emitter $e$ of the uni-junction transistor 14 exceeds the potential on the base 1 of the transistor 14. The emitter $e$ and the base 1 of the transistor 14, in effect, operate in a manner equivalent to the anode and cathode of a diode so that current flows between the emitter $e$ and the base 1 of the transistor 14. The equivalent diode of the uni-junction transistor 14 is depicted in FIGURE 2 at 20.

Upon the initiation of current flow between the emitter e and the base 1 of the uni-junction transistor 14, the impedance between these elements decreases rapidly to a relatively low value in the order of several ohms. The rapid change in impedance from the base 2 to the base 1 provides a voltage surge across the winding 15. The current through the winding of the relay 15 develops a large back-electromotive force. The back-electromotive force is developed because of the self inductance of the winding 15. The current through the winding 15 develops a magnetic field which produces a voltage across the winding by electromagnetic induction which is opposite in direction to the voltage impressed on the coil. The impressed voltage changes rapidly due to the rapid change in impedance presented by the transistor 14 so that the induced voltage is quite large. The induced voltage retards the increase of current through the winding 15 and it breaks down a control member 18 connected to the winding 15. The relay does not operate until the member 18 breaks down. The control member 18 has two terminals designated respectively as P and N terminals. The P terminal or control member 18 is connected to the movable arm of the switch 11 and the N terminal of the control member 18 is connected to the common connection between the base 1 and the winding of the relay 15.

The control member 18 may be a four layer semi-conductor diode of the type described by William Shockley in an article on the unique properties of the four-layer diode in Electronics Industries, August 1957. Briefly, the four-layer diode is a two terminal device having these operating conditions: an open or low conductance state corresponding to approximately 100 megohms, and the closed or high conductance state corresponding to approximately 3 ohms. The impedance of the diode 18 in the conductive state is less than the impedance of the transistor 14 in the conductive state. When the voltage across the member or diode 18 exceeds a predetermined breakdown potential in the direction indicated by the slanted line for the symbol of the diode 18, the diode 18 assumes its low impedance condition. The breakdown potential may illustratively be 25 volts and the diode 18 may be of the type 4NZOD manufactured by the Shockley Semiconductor Laboratories.

Before the uni-junction transistor becomes conductive, the potential across the semi-conductor diode 18 is approximately 20 volts because very little current flows through it or through the uni-junction transistor 14 to the relay winding 15. When the uni-junction transistor 14 becomes conductive, the surge of current through the winding of the relay 15 develops an electromotive force in the direction to increase the voltage difference across the diode 18. The diode 18 accordingly breaks down or assumes its low impedance condition to provide a low impedance path for the winding of the relay 15. The breakdown of the diode 18 effectively provides a large pulse with a steep wavefront to the winding of the relay 15. The voltage across the winding 15 is, in this manner, for a brief interval, quite large and the current through the diode 18 is also quite large. The relay operates only after the diode 18 breaks down. The relay 15 need not be highly sensitive or utilize low impedance windings, because of the steep wavefront pulse provided by the operation of the diode 18. With the transistor 14 in its low impedance condition and the induced voltage across the winding 15 reduced, the capacitor 13 discharges somewhat through the emitter e to the base 1 path.

The winding of the relay 15 is magnetically coupled to two armatures or switches 16 and 17 which operate to contact their lower associated contacts when the winding 15 is energized. The switch 16 completes a short circuiting path across the diode 18 from the movable arm of the switch 11 to the winding of the relay 15. After the relay 15 operates, the operating current does not, therefore, pass through the diode 18 and the diode 18 accordingly restores to its original high impedance condition. The switch 17 is moved to its lower position to provide an indication to an output or utilization circuit 19.

The timing circuit provides for increased precision in indicating a particular period of time because of the inclusion of the uni-junction transistor 14. This results from the operation of the transistor 14 in providing a high impedance during states of non-conductivity and in providing a low impedance upon becoming conductive. Because of the high impedance during periods of non-conductivity, current through the relay winding 15 is inhibited. However, when the uni-junction transistor 14 becomes conductive, it provides for a surge of current to develop a back-electromotive force across the winding of the relay 15 without material loss through the uni-junction transistor 14. The utilization of the Shockley diode 18 in combination with the uni-junction transistor 14 permits a wide latitude of the parameters of the relay 15. For example, the circuit is operable to provide an accurate timing interval for relay windings in a substantial range of impedance values.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A timing circuit, including,
    a capacitive circuit arrangement including a capacitance for providing progressively increasing voltages across the capacitance in accordance with increases in the charge in the capacitance,
    transistor means coupled to and controlled by said capacitive circuit arrangement and having high and low impedance conditions and provided with characteristics to become converted from said condition of high impedance to said condition of low impedance upon the production of a first particular voltage across said capacitance in said capacitive circuit arrangement,
    a source of potential connected to said capacitive circuit arrangement and to said transistor means to obtain a flow of a charging current in said capacitive circuit arrangement,
    a two-terminal bistable device connected to said transistor means and having first and second states of operation respectively providing high and low impedances and operable in the second state upon the introduction across the bistable device of a second particular voltage greater than the potential from the source and operable in the first state upon the introduction across the bistable device of voltages less than the second particular voltage,
    switching means actuatable to connect said source to said capacitive circuit arrangement and to said transistor means and to said bistable device, and
    a relay having a winding coupled to said transistor means for developing an electromotive force upon the operation of said transistor means in the low impedance condition to obtain the introduction across the bistable device of the second particular voltage, the relay being coupled to said bistable device and being provided with characteristics to become operative by the potential from the source upon the production of a low impedance in the bistable device.

2. A timing circuit for providing an indication as to a timing interval, including,
    first transistor means having high impedance and low impedance conditions and constructed to provide the low impedance upon the introduction of a particular potential to the first transistor means, a capacitive circuit arrangement including a capacitance coupled to said first transistor means for applying a biasing potential to said transistor means to change the condition of said transistor means from its high impedance to its low impedance condition upon the occurrence of a particular charge across the capacitor and to provide for a discharge of the capacitance through the transistor means upon the occurrence of the low impedance condition in the transistor means, a source of potential connected to said capacitive circuit arrangement to charge the capacitor in the capacitive circuit, a relay having a winding coupled to said transistor means for developing a control potential across the winding when the condition of said transistor means is changed from its high impedance to its low impedance condition by said capacitive circuit arrangement, the relay being provided with characteristics to remain inoperative upon the occurrence of the low impedance condition in the first transistor means and to become operative upon the inclusion in a circuit with the winding and the source of potential of a particular impedance less than the low impedance from the transistor means, and second transistor means coupled to said winding and said first transistor means and said source of potential and having a high impedance upon the introduction to the second transistor means of the potential from the source and having second low impedance less than the first low impedance of the first transistor means and less than the particular impedance upon the introduction to the second transistor means of a particular potential greater than the potential from the source and responsive to the combination of said control potential from the relay and said potential from the source for providing the second low impedance from said source to said winding to obtain an energizing of the relay.

3. A timing circuit, including, a transistor having first, second and third electrodes and having a first state of operation with a high impedance and a second state of operation with a low impedance and responsive to a particular potential across said second and third electrodes for obtaining a change in the operation of said transistor from the first state to the second state, a source of potential connected to said first electrode of said transistor to initiate a timing interval, a capacitive circuit connected to said first and said second electrodes of said transistor and to said source of potential and including a capacitance connected between the second and third electrodes of the transistor for obtaining a charge of the capacitance to the particular potential upon the introduction of the potential from the source for a particular period of time, a relay connected to said third electrode of said transistor for developing an electromotive force upon the production of the low impedance in said transistor and for providing an indication of the termination of the timing interval when it is operated, the relay being provided with characteristics to remain inoperative upon the production of the low impedance in the transistor and to become operative upon the inclusion in a circuit with the relay and the source of a particular impedance less than the low impedance from the transistor, and a bistable device connected in a circuit with said relay and said source and having a normal high impedance and an operative low impedance less than the particular impedance and responsive to the combination of said electromotive force of said relay and to the potential from the source for assuming its low impedance to obtain an energizing of said relay.

4. A timing circuit, including, a transistor having first, second and third electrodes and having a non-conductive state with a high impedance and having a conductive state with a first low impedance and having characteristics for becoming conductive upon the introduction of a particular potential between the second and third electrodes of the transistor, a source of potential connected to said first electrode to initiate a timing interval, a capacitive circuit connected to said first and said second electrodes of said transistor and to said source and including a capacitance connected between the second and third electrodes of the transistor for introducing the particular potential between said second and third electrodes after the charging of the capacitance from the source for a particular time interval, switching means coupled to said capacitive circuit and to said first electrode for connecting said source to said capacitive circuit to obtain a charging of said capacitance in said capacitive arrangement, a relay connected to said third electrode for developing an electromotive force upon the conduction of said transistor, said relay having at least one switch for providing an indication of the termination of the timing interval when the relay is energized, said relay having characteristics of becoming energized upon the inclusion in a circuit with the relay and the source of an impedance having a second particular value less than a first particular value, and a bistable device connected to said relay and to said first electrode of said transistor and to said source of potential and having a normal high impedance condition and an operative low impedance condition less than the second particular value and operative in its high impedance condition upon the introduction of only the potential from the source across the bistable device and responsive to the combination of said electromotive force and the potential from the source for assuming its low impedance condition and thereby to energize said relay to provide an indication of the termination of the timing interval.

5. A timing circuit, including, a uni-junction transistor having an emitter and first and second bases and having a non-conductive state upon the introduction between the emitter and the second base of a potential less than a particular value and having a conductive state upon the introduction between the emitter and the second base of a potential at least equal to the particular value and having a high impedance in the non-conductive state and having a first low impedance in the conductive state, a capacitive circuit for controlling the magnitude of the potential between said emitter and said second base of said transistor and having a resistor connected between said first base and said emitter of said transistor and having a capacitor connected between said emitter and said second base of said transistor to introduce a potential at least equal to the particular value between the emitter and the second base of the transistor upon the production of a particular charge across the capacitor, a source of potential connected to said first base for initiating a timing interval, a relay having a winding connected to said second base of said transistor for developing a particular control potential upon the production of a conductive state in said transistor, the relay having characteristics of becoming energized only upon introduction in a circuit with the relay and the source of an impedance having a second particular impedance value less than the first low impedance, and a transistor diode having one terminal connected to said first base of the uni-junction transistor and a second terminal connected to said second base of said uni-junction transistor and having properties of being non-conductive upon the introduction to the diode of the potential from the source and responsive to the combination of said particular control potential and the potential from the source for providing a low impedance path to said winding of said relay and having properties of providing an impedance less than the second particular impedance value in its conductive state.

6. A timing circuit, including, a transistor having first, second and third electrodes and having a non-conductive state with a high impedance and having a conductive state with a low impedance and having properties of becoming conductive upon the introduction of a particular voltage between the second and third electrodes of the transistor, a source of potential connected to said first electrode to initiate a timing interval, a capacitive circuit connected to said first and said second electrodes of said transistor and including a capacitance connected between the second and third electrodes of said transistor for introducing the particular voltage between the second and third electrodes upon the charging of the capacitance to a particular value, switching means coupled to said capacitive circuit and to said first electrode of said transistor for connecting said source to said capacitive circuit and to said transistor to obtain a charging of the capacitance to the particular value and to bias said transistor to a state of conductivity upon the occurrence of the particular charge in the capacitance, a relay connected to said third electrode of said transistor for developing an electromotive force upon the occurrence of a state of conductivity in said transistor, said relay having at least one switch for providing an indication of the termination of the timing interval when the relay is energized, the relay having characteristics of becoming energized upon the introduction in a circuit with the source of potential and the relay of an impedance having a particular value less than the low impedance of the transistor in the conductive state of the transistor, and a two-terminal bistable device connected in a circuit with said relay and with said source of potential and having a normal high impedance condition and an operative low impedance condition with an impedance value less than the particular value and having characteristics of remaining in its high impedance condition upon the introduction to the bistable device of the potential from the source and responsive to the combination of said electromotive force and the potential from the source for assuming its low impedance condition and thereby to obtain an energizing of said relay to provide an indication of the termination of the timing interval, said relay also having a switch connected across said bistable device and responsive to the operation of said relay for short circuiting said bistable device and also said transistor to return the bistable device to its high impedance condition and the transistor to a non-conductive condition.

7. A timing circuit in accordance with claim 6, wherein said transistor is a uni-junction transistor, said second electrode is the emitter of said uni-junction transistor, and said bistable device is a four-layer transistor diode.

References Cited in the file of this patent

UNITED STATES PATENTS 2,867,754    O'Bleness _____ Jan. 6, 1959

FOREIGN PATENTS 815,361    Great Britain _____ June 24, 1959